United States Patent

Nero et al.

[11] 4,063,133
[45] Dec. 13, 1977

[54] HORIZONTAL DEFLECTION CIRCUIT WITH TIMING CORRECTION

[75] Inventors: Leroy William Nero; Ronald Eugene Fernsler, both of Indianapolis, Ind.

[73] Assignee: RCA Corporation, New York, N.Y.

[21] Appl. No.: 743,313

[22] Filed: Nov. 19, 1976

[51] Int. Cl.² ............................................. H01J 29/56
[52] U.S. Cl. .................................... 315/370; 358/159; 315/387
[58] Field of Search ............... 315/370, 371, 406, 411, 315/387; 358/159

[56] References Cited

U.S. PATENT DOCUMENTS

| 4,009,426 | 2/1977 | Bohringer | 315/387 |
| 4,013,923 | 3/1977 | Den Hollander | 315/387 |

Primary Examiner—Maynard R. Wilbur
Assistant Examiner—T. M. Blum

Attorney, Agent, or Firm—Eugene M. Whitacre; Paul J. Rasmussen; Joseph Laks

[57] ABSTRACT

A horizontal deflection circuit comprises a deflection winding, an output deflection circuit for generating deflection current and retrace pulses, an oscillator and driver circuit for providing drive signals to the output deflection circuit, a frequency and phase control circuit for synchronizing the deflection current with incoming sync pulses, and a correction circuit. The correction circuit corrects for variations in initiation of retrace which are not adjusted by the frequency and phase control circuit, such as caused by variations in storage time delay of an output transistor. The correction circuit includes a sawtooth generator for obtaining a sawtooth voltage from a retrace pulse and a peak separator to which the sawtooth voltage is coupled for generating voltage pulses for providing a correction voltage to the oscillator and driver circuit.

8 Claims, 5 Drawing Figures

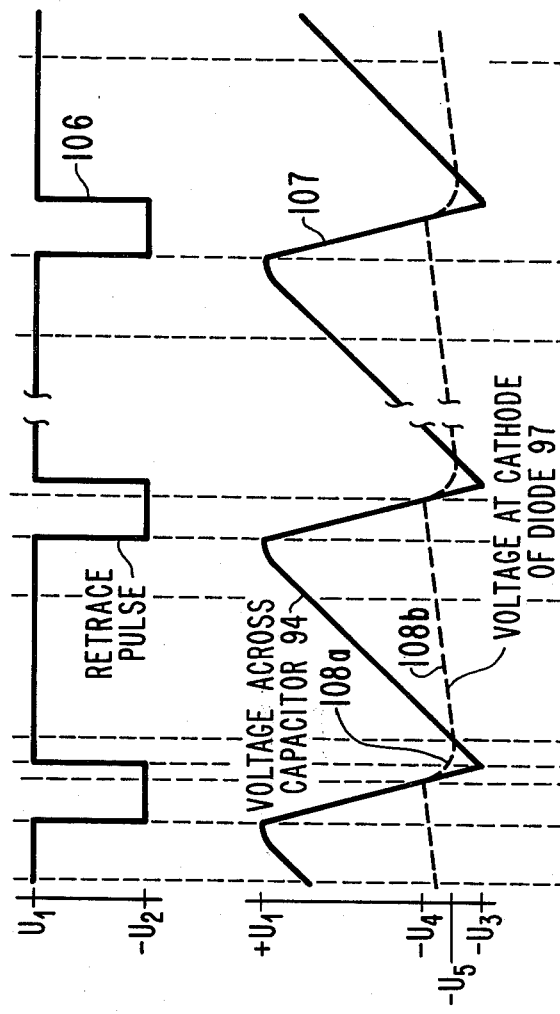

HORIZONTAL DEFLECTION CIRCUIT WITH TIMING CORRECTION

BACKGROUND OF THE INVENTION

This invention relates to horizontal deflection circuits in television receivers.

Video signals, representative of an image to be displayed, are processed by the television receiver for display on the screen of a cathode ray tube. The composite video signal includes signals representative of an image to be displayed and includes timing information in the form of sync pulses superimposed upon the blanking portions of the video signals.

The video information is displayed on the CRT screen through modulation of one or more electron beams deflected vertically and horizontally to form a raster. Horizontal deflection of the electron beam is accomplished by generating a linear sawtooth horizontal deflection current in the horizontal deflection winding. The midpoint of the horizontal scan line should coincide with the horizontal center of the screen. This point usually occurs when the deflection current is zero.

Various raster distortions may result under conditions of heavy video loading of the high voltage circuits which provide accelerating potentials for the electron beams. One distortion, known as blooming, results in symmetrical variations in size of the raster caused by a decrease in high voltage during instants of heavy video loading. An increase in raster width caused by blooming may be offset by decreasing the B+ voltage under heavy loading. The B+ voltage is used as a driving voltage for the horizontal deflection winding to provide a sawtooth scanning current. A decrease in B+ voltage results in a decrease in peak-to-peak scanning current providing for blooming compensation.

Another raster distortion may arise if there are any shifts in the average horizontal beam current under heavy video loading. As taught by U.S. Pat. No. 3,959,689, granted to J. Ikoma, video loading of the high voltage circuits results in greater energy being coupled from the retrace pulses of the horizontal deflection winding to the high voltage circuit by the horizontal output transformer. This causes a shifting of the average horizontal deflection current and a physical distortion of the raster as the horizontal lines of the raster shift relative to the cathode ray tube screen. A voltage analogous to that of the average horizontal deflection current is obtained by sampling the electron beam current. The voltage is coupled to the horizontal oscillator in order to change the oscillator frequency in a manner which compensates for the distortion.

The origin of additional raster distortion is taught in U.S. Pat. No. 3,426,244, granted to G. Strachanow. Heavy video loading may cause a widening of the retrace pulses coupled as comparison pulses to the phase discriminator diodes of a phase detector. The phase detector undesirably responds to the increased width of the retrace pulses by generating an error voltage for changing the horizontal oscillator frequency, causing a shift of horizontal lines and a distortion of the picture display. A compensating voltage obtained by sampling the current through the horizontal output transistor is developed across a resistor and is coupled to the junction of the phase discriminator diodes, which cancels the error voltage and corrects for the distortion.

Still another raster distortion is caused by variations in storage time delay in the cutoff of the horizontal output transistor after its base-emitter junction is reversed biased, resulting in variations in the initiation of the retrace interval. Because of these variations, the deflection current is no longer synchronized with the sync pulses, and the video information is no longer displayed in the proper positions in each line of the raster, causing a distorted display.

One method of compensating for this distortion, as disclosed in U.S. Pat. No. 3,891,800, granted to P. J. H. Janssen, et al., is to couple together in a second phase comparator the retrace pulses and the output signal of an oscillator synchronized with the sync pulses. The output of the second phase comparator serves as an error voltage for adjusting the frequency of the horizontal oscillator to compensate for the distorted display. Two phase comparators and two oscillators are required for such a correction arrangement.

SUMMARY OF THE INVENTION

A deflection circuit comprises a deflection winding, an output deflection circuit for generating deflection current and retrace pulses, oscillator and driver means for providing drive signals, a synchronization circuit for synchronizing the deflection current with incoming sync signals and a correction circuit for providing correction voltage which corrects for variations in initiation of retrace that are not adjusted by the synchronization circuit. The correction circuit comprises a circuit for providing a sawtooth voltage in response to a retrace pulse and a peak separator for providing voltage pulses during a peak voltage excursion of the sawtooth voltage. The voltage pulses are coupled to the oscillator and driver circuit for providing the correction voltage.

BRIEF DESCRIPTION OF THE DRAWINGS

FIGS. 2A – 2D illustrate waveforms associated with the circuit of FIG. 1.

DESCRIPTION OF THE INVENTION

Figure 1:
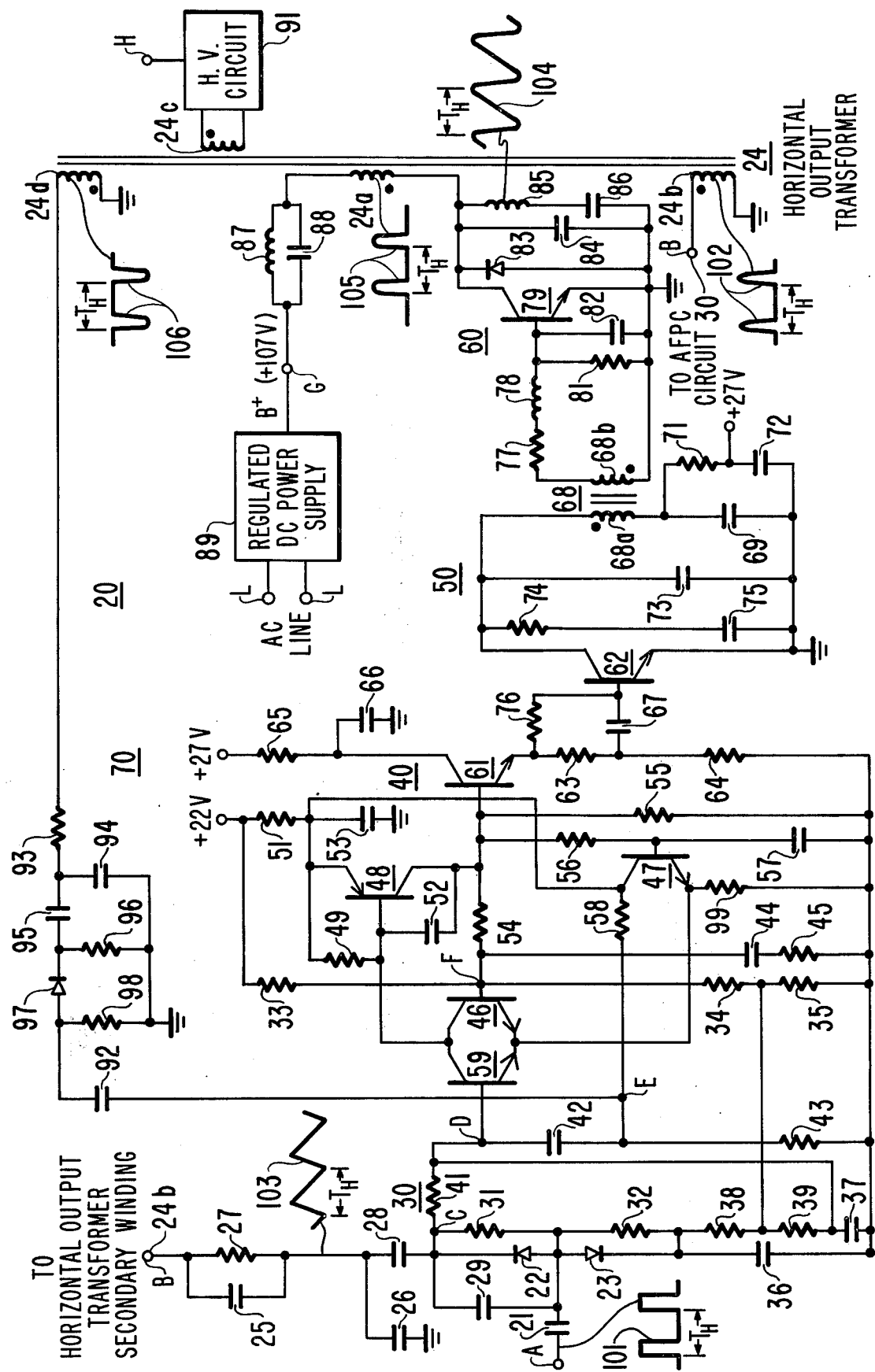
FIG. 1 illustrates a horizontal deflection circuit embodying the invention.

In FIG. 1, positive horizontal sync pulses 101 of a frequency ($1/T_H$), and obtained from a sync separator, not shown, are coupled at a terminal A through a capacitor 21 to the anodes of a pair of phase discriminating diodes 22 and 23 of a conventional automatic phase and frequency control circuit 30 of a horizontal deflection circuit 20. Positive-going horizontal retrace pulses 102 generated in a secondary winding 24b of a horizontal output transformer 24 are coupled to a terminal B.

An integrating network comprising capacitors 25 and 26 and resistor 27 is coupled to terminal B. Retrace pulses 102 appear as sawtooth voltages 103 at the junction of capacitor 26 and resistor 27. The sawtooth voltages are coupled to the cathode of diode 22 and the anode of diode 23 by means of a capacitor 28 and a capacitor 29, respectively. A pair of load resistors 31 and 32 are coupled across the diodes 22 and 23.

A voltage divider network comprising resistors 33 through 35 is coupled between a +22V supply and ground. A DC voltage appearing at the junction of resistors 34 and 35 provides a DC reference level for diodes 22 and 23 by means of capacitors 36 and 37 and resistors 38 and 39.

If the retrace pulses 102 are not synchronized with sync pulses 101, a net AC voltage appears at a terminal C, the terminal being coupled to the junction of capacitor 28 and the cathode of diode 22. This AC voltage is smoothed by a filtering network comprising a resistor 41 coupled at each end, respectively, to an input terminal D and to capacitor 37 and comprising a capacitor 42 coupled at each end, respectively, to terminal D and a resistor 43. A terminal E forms the junction of capacitor 42 and resistor 43.

The smoothed voltage appearing at terminal D serves as a control voltage for controlling the frequency of a voltage controlled oscillator 40. The RC time constants of the filtering network are typically chosen to be relatively large with respect to the horizontal frequency ($1/T_H$). Such a choice will prevent noise pulses and other spurious signals from prematurely and sporadically changing the oscillator frequency.

Oscillator 40 is similar to the one described in U.S. Pat. No. 3,611,176; granted to Todd J. Christopher, and its operation will only be briefly described. An upper trigger voltage $V_2$ is established at a terminal F by voltage dividing resistors 33-35. Terminal F is coupled to ground by a series filter of a capacitor 44 and a resistor 45. Terminal F is coupled to the base of a switching transistor 46. The emitter of transistor 46 is coupled to the emitter of a trigger transistor 47, and the collector is coupled to the base of an inverting transistor 48 and to the +22V supply through resistors 49 and 51. Coupled across the base and collector of transistor 48 is an integrating capacitor 52. The emitter of transistor 48 and a bypass capacitor 53 are coupled to the collector of transistor 47 at the junction of resistors 49 and 53.

The collector of transistor 48 is coupled to terminal F through a resistor 54 and is coupled to ground to an integrating network comprising a resistor 55 in parallel with the series network of a resistor 56 and a capacitor 57. The base of transistor 47 is coupled to the junction of resistor 56 and capacitor 57, and the collector is coupled to terminal E through a resistor 58. The emitter of transistor 47 is coupled to ground through a resistor 99.

With the voltage at terminal F at the upper trigger voltage $V_2$, transistor 46 is conducting, forward biasing transistor 48 into conduction. Capacitor 57 is charging to the $V_2$ voltage level, current flowing from the +22V supply through resistor 51, transistor 48, resistor 56 to capacitor 57. When capacitor 57 charges to $V_2$, trigger transistor 47 is forward biased and conducts, turning off transistors 46 and 48. A new lower trigger voltage $V_1$ is established at terminal F.

Capacitor 57 begins to discharge to ground through resistors 56 and 55. Since the voltage at the emitter of transistor 47 is now $V_1 - V_{be}$, transistor 47 will turn off when capacitor 57 discharges to the lower trigger voltage $V_1$. Transistor 46 conducts, turning on transistor 48 and re-establishing the upper trigger voltage $V_2$ at terminal F, thereby completing one oscillator cycle.

The exact oscillator frequency is controlled by a transistor 59 having a collector and emitter coupled to the collector and emitter, respectively, of transistor 46. The base of transistor 59 is coupled to input terminal D. The voltage at terminal D establishes the lower trigger voltage $V_1$ at which trigger transistor 47 turns off. AFPC circuit 30 supplies a control voltage to terminal D which varies the lower trigger voltage in order to synchronize the retrace pulses generated by the horizontal output transformer 24 to the incoming sync pulses.

The collector of transistor 48 is coupled to the base of a buffer transistor 61. The emitter of transistor 61 is coupled through a resistor 76 to a driver circuit 50 at the base of a driver transistor 62. The emitter is also coupled to ground through resistors 63 and 64. The collector of transistor 61 is coupled to a +27V supply through a resistor 65 and is also coupled to a bypass capacitor 66. A capacitor 67 couples the junction of resistors 63 and 64 to the base of transistor 62.

The collector of transistor 62 is coupled to one end of a primary winding 68a of a driver transformer 68. The other end of primary winding 68a is coupled to ground through filtering elements 69-72. The junction of resistor 71 and capacitor 72 is coupled to the +27V supply. Coupled across the collector and emitter of transistor 62 is a pulse shaping and damping network comprising a capacitor 73 and a series coupled resistor 74 and a capacitor 75.

When transistor 48 turns off, transistor 61 turns off, turning off transistor 62. With the winding polarities as indicated in FIG. 1, a positive turn-on voltage drive signal is generated in a secondary winding 68b of driver transformer 68. One end of secondary winding 68b is coupled through a resistor 77 and an inductor 78 to the base of an output transistor 79 of an output deflection circuit 60. The other end of winding 68b is coupled to the emitter of transistor 79 and to ground. Coupled across the base and emitter of transistor 79 is a resistor 81 and a capacitor 82.

Coupled across the collector and emitter of transistor 79 is a damper diode 83, a retrace capacitor 84 and a series coupled horizontal deflection winding 85 and an "S" shaping capacitor 86.

B+ deflection voltage, shown illustratively as +107V, is obtained at a terminal G and is coupled to deflection winding 85 through a high voltage tuning network of an inductor 87 and a capacitor 88 and then through a primary winding 24a of horizontal output transformer 24. The B+ voltage provides for generation of a trace current 104 in deflection winding 85. AC line voltage at terminals L—L are coupled to a regulated DC power supply circuit 89 whose output is the B+ voltage.

The positive turn-on signal is generated in secondary winding 68b near the center of the trace interval of each deflection cycle. Transistor 79 turns on and conducts trace current. Towards the end of trace, transistor 48 turns off, turning off transistors 61 and 62. A negative turn-off voltage drive signal is coupled to the base of transistor 79. Elements 77, 78, 81, 82 serve to quickly cutoff output transistor 79 and to prevent any ringing component from developing in the turn-off signal which would prematurely turn-on or turn-off transistor 79.

Although the base-emitter junction of transistor 79 is reverse biased, the base current, however, does not decay to zero immediately upon application of the reverse biasing signal. Instead, a reverse base current exists for a significant interval. This reverse current is caused by charge stored in the base region of transistor 79 during saturated operation. Current still flows into the collector and out of the base until the stored charge is swept out of the base-collector junction.

When the excess stored charge is removed, the reverse current decays to zero, and the collector voltage of output transistor 79 begins to increase, thereby initiating the retrace interval. AFPC circuit 30 will normally synchronize the phase of oscillator 40 in such a manner that the incoming horizontal sync pulses 101 are centered within the retrace interval, thereby providing for a proper picture display.

During retrace, with transistor 79 nonconducting, deflection winding 85 and capacitor 84 form a resonant circuit which operates for one-half a cycle, and the deflection current 104 reverses direction. Positive retrace pulses 105 are generated in primary winding 24a and are coupled through a tertiary winding 24c of horizontal output transformer 24 to a high voltage circuit 91. High voltage circuit 91 provides a high voltage at a terminal H to the ultor of a cathode ray tube, not shown.

Damper diode 83 is forward biased at the negative half-cycle of resonance of winding 85 and capacitor 83, terminating the retrace interval, and conducts current during the first part of the trace interval.

Under heavy video loading, power supply 89 may not be able to supply the proper B+ voltage at terminal G. Variations in B+ voltage will cause variations in peak-to-peak deflection current through deflection winding 85 which, to a first approximation, is proportional to the B+ voltage. Any variations in the B+ voltage will result in variations in the peak current through deflection winding 85 and in the peak current through the collector of output transistor 79 towards the end of the trace interval.

Since the amount of storage time delay depends upon the transistor collector current, variations in collector current towards the end of trace will result in variations in storage time delay. The variations in storage time delay will result in variations in the initiation of the retrace and trace intervals relative to the predetermined instant of arrival of the horizontal sync pulses.

Such timing errors, which produce a distorted picture display, occur at frequencies greater than the response frequency of AFPC circuit 30. Filter elements 37, 41-43 bypass any higher frequency voltages of AFPC circuit 30 from the oscillator 40 input terminal D. Increasing the response frequency of AFPC circuit 30 would be undesirable, as the spurious noise signals and transients would undesirably trigger control transistor 64 and trigger transistor 63.

A correction circuit 70 provides correction voltage signals to oscillator 40 for correcting for those variations in initiation of the retrace interval that are not compensated by AFPC circuit 30. Correction circuit 70 has its output coupled to terminal E of oscillator circuit 40 through a coupling capacitor 92. At time $T_1$ of FIG. 2A, the voltage at the base of trigger transistor 47 has decreased to its lower trigger voltage $V_1$, cutting off the transistor. Because of storage time delay, horizontal retrace does not initiate until time $T_2$. Negative-going horizontal retrace pulses 106 generated at secondary winding 24d of horizontal output transformer 24 are coupled to an integrating network comprising a resistor 93 and a capacitor 94.

As shown in FIGS. 2A and 2B, negative-going retrace pulse 106, decreasing from $+U_1$ to $-U_2$, is integrated by resistor 93 and capacitor 94, producing a negative-going sawtooth voltage 107 across capacitor 94, decreasing from $+U_1$ to $-U_3$ during the interval $T_2 - T_4$. Current flows from ground through capacitor 94 and resistor 93 through the secondary winding 24d and back to ground. During the trace interval $T_4 - T_7$, the voltage across capacitor 94 is a positive-going sawtooth.

Coupled in series across capacitor 94 is a capacitor 95 and a resistor 96. The cathode of a diode 97 is coupled to the junction of capacitor 95 and resistor 96. One end of a resistor 98 is coupled to the anode of diode 97, and the other end is coupled to ground. One end of coupling capacitor 92 is coupled to the junction of resistor 98 and diode 97, and the other end is coupled to terminal E.

The resistance of resistor 96 is selected to be much greater than the resistance of resistor 98. Elements 95-98 form a peak separator circuit, the operation of which is illustrated by the waveforms in FIGS. 2B and 2C. Before application of power to the television receiver, capacitor 95 is uncharged. After power is applied, capacitor 95 begins being charged negatively during the retrace intervals by the negative-going retrace pulses 106. Current flows from secondary winding 24d through ground, through resistor 98, diode 97, capacitor 95 and resistor 93, back to secondary winding 24d. During the succeeding trace intervals, capacitor 95 discharges only slightly, since it can discharge only through the high resistance of resistor 96. Eventually, capacitor 95 charges to near the negative peak voltage $-U_3$ that capacitor 94 charges to at the end of each retrace interval.

At time $T_3$, the negative-going sawtooth 107 has reached the value $-U_4$, equal to the slowly discharging voltage across capacitor 95. As capacitor 94 is charged more negatively, diode 97 becomes forward biased and conducts. Capacitor 95 ceases to discharge and begins to be charged negatively by the retrace pulse 106, as shown be waveform portion 108a of FIG. 2B. Current flows from ground through resistor 98, diode 97, capacitor 95, resistor 93 and secondary winding 24b, back to ground.

Capacitor 95 continues to charge negatively until time $T_5$, which occurs during the discharge portion of sawtooth voltage 107. At time $T_5$, the voltage across capacitor 94 has decreased to $-U_5$ from its negative peak of $-U_3$. Diode 97 is no longer forward biased and cuts off. Capacitor 95 ceases to charge negatively and begins to slowly discharge through resistor 96, as illustrated by waveform portion 108b of FIG. 2B, until time $T_8$ when the cycle repeats. During the interval $T_3 - T_5$, as capacitor 95 is charging, current flows through resistor 96. As illustrated by FIG. 2C, the voltage across resistor 98 is a negative voltage pulse 109 occurring around time $T_4$, the time at which sawtooth voltage 107 has reached its negative peak value.

The negative voltage pulse 109 is AC coupled by coupling capacitor 92 to terminal E of horizontal ocsillator 40. Negative pulse 109 is transformed into a correction signal 110 for the horizontal oscillator 40, as illustrated in FIG. 2d. The negative portion of correction signal 110 appears as a negative pulse portion 110a from approximately time $T_3 - T_5$ and appears as a negative-going but positively valued sawtooth voltage portion 110b from $T_5 - T_8$.

The correction voltage $V_c$ at terminal E at time $T_6$ is added through coupling capacitor 42 to the existing voltages at input terminal D to form the lower trigger voltage $V_1$. Thus, changes in the correction voltage 110 at time $T_6$, the time when the voltage at the base of trigger transistor 47 approaches its lower trigger voltage $V_1$, will result in changes in the frequency of oscillator 40.

The value of correction voltage 110 near time $T_6$, when trigger transistor 47 cuts off, determines the exact instant of cutoff. Any variation in the initiation of the retrace interval relative to the incoming sync pulse, such as caused by storage time delay variations, will result in a varying correction voltage near time $T_6$. The varying correction voltage will vary the cutoff instant in subsequent deflection cycles of trigger transistor 47 in such a manner as to substantially reduce the variations in initiation of the retrace interval.

By time $T_9$ of FIG. 2A, substantial video loading of high voltage circuit 91 has resulted in an increased storage time delay in the initiation of the retrace interval. When trigger transistor 47 cuts off at time $T_9$, retrace pulse 106 does not begin at time $T_{10}$, as it would with little video loading, but it begins at a later time $T_{11}$. In the next succeeding deflection cycle, the instant at which the voltage at the base of trigger transistor 47 reaches its lower trigger voltage is now time $T_{12}$. But because of increased storage time delay, the negative-going sawtooth portion 110b of correction voltage 110 is at a voltage $V_c'$, greater than the voltage $V_c$ of the corresponding earlier instant $T_9$ by an amount $\Delta V_c$. This increase in control voltage results in an increased oscillator frequency which, in turn, after several deflection cycles, resynchronizes the retrace intervals with the incoming sync pulses.

The incremental correction voltage $\Delta V_c$ provided by correction circuit 70 will depend upon the design choice of the circuit parameters. If fast lock-in is desired, the circuit parameters are chosen to provide a relatively sharply varying $\Delta V_c$. The cutoff of trigger transistor 47 is quite sensitive to the value of the lower trigger voltage at input terminal D. Typically for the oscillator with circuit values listed below, changes of only several tenths of a volt in the lower trigger voltage $V_1$ will produce time variations of several microseconds. Thus, the incremental correction voltage $\Delta V_c$ need not be large.

Correction circuit 70 is not as greatly prone to overshoot problems as closed loop phase comparator-oscillator systems may be. Any overcorrection by correction circuit 70 will be small in nature since the total correction voltage applied by circuit 70 need not be large, and the correction voltage need not vary greatly for satisfactory correction to occur.

The values for many of the important circuit elements are listed in the following table.

TABLE

| | |
|---|---|
| Resistor 27 | 68KΩ |
| Resistor 31 | 100KΩ |
| Resistor 32 | 82KΩ |
| Resistor 33 | 15KΩ |
| Resistor 34 | 1KΩ |
| Resistor 35 | 15KΩ |
| Resistor 38 | 390KΩ |
| Resistor 39 | 330KΩ |
| Resistor 41 | 390KΩ |
| Resistor 43 | 4.7KΩ |
| Resistor 45 | 10Ω |
| Resistor 49 | 2.7KΩ |
| Resistor 51 | 47Ω |
| Resistor 54 | 39KΩ |
| Resistor 55 | 5.6KΩ |
| Resistor 56 | 34.7KΩ |
| Resistor 58 | 4.7KΩ |
| Resistor 93 | 15KΩ |
| Resistor 96 | 1.5MEGΩ |
| Resistor 98 | 4.3KΩ |
| Resistor 99 | 8.2KΩ |
| Capacitor 21 | 56 pf |
| Capacitor 25 | 33pf |
| Capacitor 26 | 2200pf |
| Capacitor 28 | 1000pf |
| Capacitor 29 | 150pf |
| Capacitor 36 | .033μf |
| Capacitor 37 | 8200pf |
| Capacitor 42 | 1μf |
| Capacitor 44 | 270pf |
| Capacitor 52 | 10pf |
| Capacitor 53 | 4.7μf |
| Capacitor 57 | 3900pf |
| Capacitor 92 | 2200pf |
| Capacitor 94 | 4700pf |

TABLE-continued

| | |
|---|---|
| Capacitor 95 | .01μf |
| Voltage of sync pulse 101 | 22V p-p |
| Voltage of retrace pulse 102 | 260V p-p |
| Voltage of retrace pulse 106 | −200V p-p |

What is claimed is:

1. A deflection circuit for generating deflection current in synchronization with synchronizing signals, comprising:

a deflection winding;

output deflection means coupled to said deflection winding and responsive to driving signals for generating said deflection current in said deflection winding during each deflection cycle, including means for generating retrace signals indicative of the initiation of the retrace interval in said deflection cycle;

oscillator and driver means coupled to said output deflection means and responsive to control and correction signals for generating said driving signals at predetermined instants in said deflection cycle;

synchronization means coupled to said oscillator and driver means and responsive to said synchronizing signals and said retrace signals for providing said control signals to said oscillator and driver means for synchronizing said deflection current with said synchronizing signals; and correction means coupled to said oscillator and driver means for providing said correction signals to said oscillator and driver means for correcting for variations in initiation of said retrace interval that are not adjusted by said synchronizing means, said correction means comprising:

sawtooth generating means responsive to said retrace signals for providing a sawtooth voltage;

a peak separator coupled to said sawtooth means for providing voltage pulses during a peak voltage excursion of said sawtooth voltage; and means for coupling said voltage pulses to said oscillator and driver means for providing said correction signals.

2. A deflection circuit according to claim 1, wherein said output deflection means includes an output transformer coupled to said deflection winding and a high voltage circuit coupled to said output transformer for providing a high voltage to the ultor of a cathode ray tube, said variations in initiation of said retrace interval caused by video loading of said high voltage circuit.

3. A deflection circuit according to claim 1, wherein said variations in initiation of said retrace interval are caused by variations in the magnitude of said deflection current towards the end of said trace interval.

4. A deflection circuit according to claim 1, wherein said output deflection means includes a controlled semiconductor element which conducts said deflection current towards the end of said trace interval, said variations in initiation of said retrace interval caused by storage time delay variations in turning off said controlled semiconductor element.

5. A deflection circuit according to claim 4, wherein said controlled semiconductor element is a transistor.

6. A deflection circuit according to claim 1, wherein said peak separator includes a capacitor coupled to said sawtooth means for charging said capacitor during a first portion of said sawtooth voltage excursion, a diode coupled to said capacitor and responsive to said sawtooth means and poled to conduct current when the magnitude of said sawtooth voltage exceeds the voltage across said capacitor, and discharge means coupled to said capacitor for discharging said capacitor when said diode is nonconducting.

7. A deflection circuit according to claim 6, wherein said discharge means comprises a resistor.

8. A deflection circuit according to claim 6, wherein said coupling means comprises a capacitor for AC coupling said voltage pulses to said oscillator and driver means.

* * * * *